(12) United States Patent
Ogura et al.

(10) Patent No.: US 9,177,690 B2
(45) Date of Patent: Nov. 3, 2015

(54) INSULATING FILM-COATED METAL FOIL

(75) Inventors: Toyoshi Ogura, Tokyo (JP); Noriko Yamada, Tokyo (JP); Yuji Kubo, Tokyo (JP); Sawako Ito, Tokyo (JP)

(73) Assignee: NIPPON STEEL & SUMIKIN MATERIALS CO., LTD., Tokyo (JP)

( * ) Notice: Subject to any disclaimer, the term of this patent is extended or adjusted under 35 U.S.C. 154(b) by 86 days.

(21) Appl. No.: 14/233,576

(22) PCT Filed: Jul. 19, 2012

(86) PCT No.: PCT/JP2012/068384
§ 371 (c)(1),
(2), (4) Date: Jan. 17, 2014

(87) PCT Pub. No.: WO2013/012051
PCT Pub. Date: Jan. 24, 2013

(65) Prior Publication Data
US 2014/0166337 A1    Jun. 19, 2014

(30) Foreign Application Priority Data

Jul. 20, 2011    (JP) .................................. 2011-159184

(51) Int. Cl.
*H01B 5/14*    (2006.01)
*H01B 3/00*    (2006.01)
(Continued)

(52) U.S. Cl.
CPC *H01B 3/00* (2013.01); *B32B 15/08* (2013.01); *C09D 183/14* (2013.01);
(Continued)

(58) Field of Classification Search
CPC .............. H01B 1/14; H01B 1/16; H01B 1/18; H01B 1/20; H01B 1/24; H01B 7/0018
USPC ............ 174/126.4, 36, 117 R, 117 F, 117 FF, 174/250, 255, 257; 29/825
See application file for complete search history.

(56) References Cited

U.S. PATENT DOCUMENTS 4,491,622 A * 1/1985 Butt ............................... 428/632
5,686,172 A * 11/1997 Ohya et al. ................. 156/89.28
(Continued)

FOREIGN PATENT DOCUMENTS

EP    1 101 788 A1    5/2001
EP    1612040 A1    1/2006
(Continued)

OTHER PUBLICATIONS

Taiwanese Office Action dated Aug. 29, 2014 for Taiwanese Application No. 101126311.
(Continued)

*Primary Examiner* — William H Mayo, III
(74) *Attorney, Agent, or Firm* — Birch, Stewart, Kolasch & Birch, LLP

(57) ABSTRACT

An insulating film-coated metal foil having on one or both surfaces thereof an organic-inorganic hybrid layer containing dimethylsiloxane and a metalloxane comprising a metal other than Si. Relative to the concentration $[Si]_{1/4t}$ of the Si at a depth of ¼t from the surface of the organic-inorganic hybrid layer in the thickness direction of the hybrid layer, the concentration $[Si]_{3/4t}$ of the Si at a depth of ¾t from the surface of the organic-inorganic hybrid layer in the thickness direction of the hybrid layer satisfies $[Si]_{1/4t} < [Si]_{3/4t}$, and $([Si]_{3/4t} - [Si]_{1/4t})/[Si]_{3/4t}$ is 0.02-0.23. Provided is a metal foil that can be used in solar cell substrates, flexible circuit substrates, etc., that exhibits surface flatness, pliability, insulating properties and thermal resistance properties, and that has a layer having a surface which is not susceptible to scratching by processes in which substrates are handled, such as conveyance and transshipment.

4 Claims, 2 Drawing Sheets

(51) Int. Cl.
  *C23C 26/00* (2006.01)
  *C23C 30/00* (2006.01)
  *C09D 183/14* (2006.01)
  *B32B 15/08* (2006.01)
  *H01B 13/06* (2006.01)
  *C23C 18/12* (2006.01)
  *C08G 77/58* (2006.01)
  *C08G 77/16* (2006.01)
  *C23C 18/04* (2006.01)

(52) U.S. Cl.
  CPC .......... *C23C 18/122* (2013.01); *C23C 18/1216* (2013.01); *C23C 18/1241* (2013.01); *C23C 18/1283* (2013.01); *C23C 26/00* (2013.01); *C23C 30/00* (2013.01); *H01B 13/06* (2013.01); *B32B 2255/06* (2013.01); *B32B 2255/26* (2013.01); *B32B 2457/12* (2013.01); *C08G 77/16* (2013.01); *C08G 77/58* (2013.01); *C23C 18/04* (2013.01)

(56) References Cited

U.S. PATENT DOCUMENTS

| | | | | |
|---|---|---|---|---|
| 6,329,610 | B1* | 12/2001 | Takubo et al. | 174/264 |
| 2009/0133912 | A1* | 5/2009 | Miyata et al. | 174/260 |
| 2009/0321123 | A1* | 12/2009 | Lochtman et al. | 174/261 |
| 2010/0259910 | A1* | 10/2010 | Hayashi et al. | 361/783 |
| 2011/0272177 | A1* | 11/2011 | Weichslberger et al. | 174/250 |
| 2011/0292568 | A1* | 12/2011 | Eguchi et al. | 361/500 |
| 2013/0037313 | A1* | 2/2013 | Miyakoshi et al. | 174/258 |

FOREIGN PATENT DOCUMENTS

| | | | |
|---|---|---|---|
| EP | 2133394 | A1 | 12/2009 |
| JP | 5-239359 | A | 9/1993 |
| JP | 6-1847 | A | 1/1994 |
| JP | 2001-329018 | A | 11/2001 |
| JP | 2003-247078 | A | 9/2003 |
| JP | 2005-79405 | A | 3/2005 |
| JP | 2008-255242 | A | 10/2008 |
| JP | 2009-297678 | A | 12/2009 |
| TW | I295627 | B | 4/2008 |
| TW | 200902655 | A | 1/2009 |

OTHER PUBLICATIONS

International Search Report, mailed Oct. 30, 2012, issued in PCT/JP2012/068384.

Extended European Search Report, dated Feb. 17, 2015, for European Application 12814565.3.

* cited by examiner

INSULATING FILM-COATED METAL FOIL

TECHNICAL FIELD

The present invention relates to an insulating film-coated metal foil, which has been obtained by coating a metal foil with an insulating film comprising an organic-inorganic hybrid. The insulating film-coated metal foil according to the present invention can suitably be used, for example, for the purpose of the mounting of a micro-component of an electronic device, such as thin-film transistor (TFT), organic EL display and electronic paper.

BACKGROUND ART

Films of silica ($SiO_2$) are used as electrically insulating coatings in various fields, because they comprise an inorganic oxide, may be excellent in the heat resistance, electrical insulation and the like, and flat films thereof may easily be obtained. Further, the silica film may generally be produced by using a vapor-phase process such as PVD (Physical Vapor Deposition) and CVD (Chemical Vapor Deposition), or a liquid-phase process such as sol-gel method.

In connection with the recent requirements for a sophisticated arrangement of electronic devices and/or electronic components, the intensity of an electric field to be used therein may also tend to be increased. A higher insulating property may be required in such an arrangement of devices or electronic components involving a high electric field intensity and therefore, the thickness of the silica film should be increased to a higher level.

However, in any of the above-described production processes such as vapor-phase process and liquid-phase process, it may be difficult to form a thick silica film, and usually, when the film thickness is 1 μm or more, crack formation is more liable to occur. The reason therefor may be considered because the Young's modulus of the "silica" itself constituting the film is high, and it is difficult for the film to conform to and relieve the stress, with respect to the internal stress generated during the film formation process due to a difference in the thermal expansion rate from the substrate material, or the internal stress generated due to the shrinkage of the film itself.

Further, in the case of an electronic device capable of deforming into a curve or the like, represented by an electronic paper, a silica insulating coating having a low flexibility (that is, having a high Young's modulus) can hardly conform to the deformation thereof as mentioned above, and therefore, it has generally been considered that a silica insulating coating may be improper for such an electronic device capable of being deformed.

As a measure for solving the above-described problem, Non-Patent Documents 1 and 2 propose an organic-modified silicate film, where an organic group is introduced into the siloxane network of the silica. They also disclose that, in a film made of a material also called, for example, an organic-inorganic hybrid (inorganic-organic hybrid), Ormosils or Ceramers, when an organic group such as methyl group is introduced into the siloxane network, the rigidity of the siloxane network may be relieved and the Young's modulus thereof may be decreased, whereby a film deposition even to a film thickness of 1 μm or more can be achieved without causing a crack therein.

Patent Document 1 discloses that such an organic-modified silicate film may be produced by using an organoalkoxysilane $R_xSi(OR')_{4-x}$ (wherein R is an organic group, OR' is an alkoxy group, and x is 1, 2 or 3) as a starting material, by a method of forming a structure where an organic group R is introduced into the siloxane network through a hydrolysis/polycondensation reaction (generally, referred to as "sol-gel method"); that among structures having an organic group R which has been introduced into the siloxane network, a structure having a diorganosiloxane —O—Si(R)$_2$—O— where two organic groups are bonded to Si may further have a flexibility and may be more preferred for the above-described purpose; that in particular, dimethylsiloxane —O—Si(CH$_3$)$_2$—O— where the organic group R of the diorganosiloxane above is a methyl group may be more preferred in the flexibility and also excellent in the heat resistance; that the structure containing dimethylsiloxane may include a structure which has been obtained by using a polydimethylsiloxane X-[—Si(CH$_3$)$_2$—O]$_m$—Si(CH$_3$)$_2$—X (wherein X is a reactive functional group, and m is the number of units of the polydimethylsiloxane) as the starting material, by reacting it together with a metal alkoxide M(OR)$_n$ (wherein n is the number of alkoxy groups and is usually the valence of M); and that above all, when the mass-average molecular weight Mw of the polydimethylsiloxane is 900 or more, the production of a thick film of 1 μm or more may be facilitated, to thereby easily provide an insulating coating having a flexibility which is high enough to conform to the deformation of the substrate.

Patent Document 2 discloses, as a material which is analogous to the organic-modified silicate as described above, a silicone resin composition formed from a chain silicone oligomer such as polydimethylsiloxane, a metal alkoxide and an inorganic filler to be used for an insulating coating layer of a heat-resistant insulated electric wire.

Patent Document 3 discloses, in relation to a thin-film solar cell substrate, a method for forming an insulating coating formed on the surface thereof and having an irregular structure so as to enhance the light trapping efficiency, where the surface irregular structure is formed by utilizing a phase separation into a hydrophobic phase and a hydrophilic phase so as to provide a film to be formed from a polydimethylsiloxane and a metal alkoxide.

Patent Document 4 discloses an insulating coating having a flattened the surface, which has been formed from a poly(di-organo)siloxane and a metal alkoxide. It also discloses that the insulating coating is a film which is excellent in the flatness and therefore, may suitably be used as a coated substrate having an insulating coating with a large thickness to be used for an electronic device such as thin-film transistor, liquid crystal display, organic EL display and electronic paper.

RELATED ART

Patent Document

Patent Document 1: Japanese Unexamined Patent Publication (JP-A; KOKAI) No. 2003-247078
Patent Document 2: JP-A No. 5-239359
Patent Document 3: JP-A No. 2005-79405
Patent Document 4: JP-A No. 2008-255242

Non-Patent Document

Non-Patent Document 1: Sumio Sakka, *Sol-Gel Ho no Kagaku* (*Science of Sol-Gel Method*), Agne-Shofu Sha, pp. 115-153 (1990)
Non-Patent Document 2: Sumio Sakka, *Sol-Gel Ho no Oyo* (*Application of Sol-Gel Method*), Agne-Shofu Sha, pp. 57-115 (1997)

SUMMARY OF THE INVENTION

Problems to be Solved by the Invention

However, the metal foils which have been provided with an organic-inorganic hybrid layer disclosed in Patent Documents 1 to 4 have the following problems.

Thus, the degree of flexibility of the organic-inorganic hybrid layer can be controlled by adjusting the blending of a metal alkoxide capable of crosslinking with the dimethylsiloxane so as to cause the curing. However, if the organic-inorganic hybrid layer is too soft, the surface may easily be scratched and a scratch may be formed in the organic-inorganic hybrid layer, for example, in the step of transportation or transshipment of the substrate, to thereby give rise to a defective product. On the other hand, if the layer is hardened so as to prevent the surface scratching, a crack may be formed during the film formation, whereby a flat film excellent in the insulating property cannot be obtained, or a crack formation may occur in the layer when the substrate is to be bent. Accordingly, it may be difficult to satisfy both of the flexibility and the surface hardness, only by merely adjusting the component.

An object of the present invention is to provide a metal foil, which includes an organic-inorganic hybrid layer having a flexibility, in addition to an insulating property, a heat resistance and a surface flatness, and is less liable to be scratched on the surface of the layer in the process of handling the substrate, such as transportation and transshipping.

Means for Solving the Problem

As a result of earnest study, the present inventors have found that, for the purpose of providing the surface of an organic-inorganic hybrid layer to be applied to a metal foil, which is less liable to be scratched, while maintaining the characteristics required for an electronic device capable of being deformed into a curve or the like (i.e., insulating property, heat resistance, flexibility and surface flatness), it is very effective to form, as the organic-inorganic hybrid layer, a layer comprising a polydimethylsiloxane and a metal alkoxide including one or more metals selected from: Mg, Ca, Y, Al, Sn, Ti, Zr, Nb, Ta and W, blended therein, and further, to decrease the Si concentration in the direction from the metal foil side toward the surface of the layer, by providing a specific gradient of the concentration [Si] of Si in the thickness direction of the organic-inorganic hybrid layer. The present invention has been accomplished based on this discovery.

The gist according to the present invention resides in the followings.

[1] A process for producing an insulating film-coated metal foil having an organic-inorganic hybrid layer, comprising:

coating a metal foil with a liquid which has been obtained by blending a polydimethylsiloxane and a metal alkoxide containing one or more metals selected from: Mg, Ca, Y, Al, Sn, Ti, Zr, Nb, Ta and W, drying the coating at 70 to 210° C., and subjecting the coating to temperature elevation at a temperature rise rate of 30 to 80° C./min and holding the temperature at to 600° C. for 30 to 240 minutes, wherein the concentration $[Si]_{1/4t}$ of Si at a depth of ¼t from the surface of the organic-inorganic hybrid layer along the thickness direction of the layer has the following relationship with the concentration $[Si]_{3/4t}$ of Si at a depth of ¾t from the surface of the organic-inorganic hybrid layer along the thickness direction of the layer:

$$[Si]_{1/4t} < [Si]_{3/4t}$$

and the value of the relative ratio of the Si concentrations, $R_{Si} = ([Si]_{3/4t} - [Si]_{1/4t})/[Si]_{3/4t}$, is from 0.02 to 0.23.

[2] The process for producing an insulating film-coated metal foil according to [1], wherein the ratio $A_{1/2t} = [M]_{1/2t}/[Si]_{1/2t}$ between the concentration $[Si]_{1/2t}$ of Si and the concentration $[M]_{1/2t}$ of metal element M of a metaloxane comprising a metal element other than Si at a depth of ½t from the surface of the organic-inorganic hybrid layer along the thickness direction of the layer has the following relationship with the ratio: $A_{1/10t} = [N]_{1/10t}/[Si]_{1/10t}$ between the concentration $[Si]_{1/10t}$ of Si and the concentration $[M]_{1/10t}$ of metal element M of the metaloxane at a depth of ⅒t from the surface of the organic-inorganic hybrid layer along the thickness direction of the layer:

$$1.0 \times A_{1/2t} < A_{1/10t} < 2.0 \times A_{1/2t}.$$

[3] An insulating film-coated metal foil comprising a metal foil and an organic-inorganic hybrid layer disposed on one surface or both surfaces of the metal foil, wherein the organic-inorganic hybrid layer is a layer which has been obtained by blending a polydimethylsiloxane and a metal alkoxide containing one or more metals selected from: Mg, Ca, Y, Al, Sn, Ti, Zr, Nb, Ta and W, the concentration $[Si]_{1/4t}$ of Si at a depth of ¼t from the surface of the organic-inorganic hybrid layer along the thickness direction of the layer has the following relationship with the concentration $[Si]_{3/4t}$ of Si at a depth of ¾t from the surface of the organic-inorganic hybrid layer along the thickness direction of the layer:

$$[Si]_{1/4t} < [Si]_{3/4t}$$

and the value of the relative ratio of the Si concentrations, $R_{Si} = ([Si]_{3/4t} - [Si]_{1/4t})/[Si]_{3/4t}$, is from 0.02 to 0.23.

[4] The insulating film-coated metal foil according to [3], wherein ratio $A_{1/2t} = [M]_{1/2t}/[Si]_{1/2t}$ between the concentration $[Si]_{1/2t}$ of Si and the concentration $[M]_{1/2t}$ of metal element M of a metaloxane comprising a metal element except for Si at a depth of ½t from the surface of the organic-inorganic hybrid layer along the thickness direction of the layer has the following relationship with the ratio: $A_{1/10t} = [M]_{1/10t}/[Si]_{1/10t}$ between the concentration $[Si]_{1/10t}$ of Si and the concentration $[M]_{1/10t}$ of metal element M of the metaloxane at a depth of ⅒t from the surface of the organic-inorganic hybrid layer along the thickness direction of the layer:

$$1.0 \times A_{1/2t} < A_{1/10t} < 2.0 \times A_{1/2t}.$$

Effect of the Invention

The present invention may provide a metal foil with an insulating coating, which has an insulating property, a heat resistance, a flexibility and a surface flatness and is less susceptible to surface scratching during the transportation, transshipping thereof, and the like. Such a metal foil can suitably be used as a material for a substrate such as solar cell substrate and flexible circuit substrate. That is, the surface of the insulating coating layer may be resistant to the scratching, as compared with that of the conventional insulating film-coated metal foil substrate, and therefore, when a solar cell or a circuit is mounted therewith, the yield of the resultant product can remarkably be enhanced.

MODE FOR CARRYING OUT THE INVENTION

First Embodiment

Figure 1:
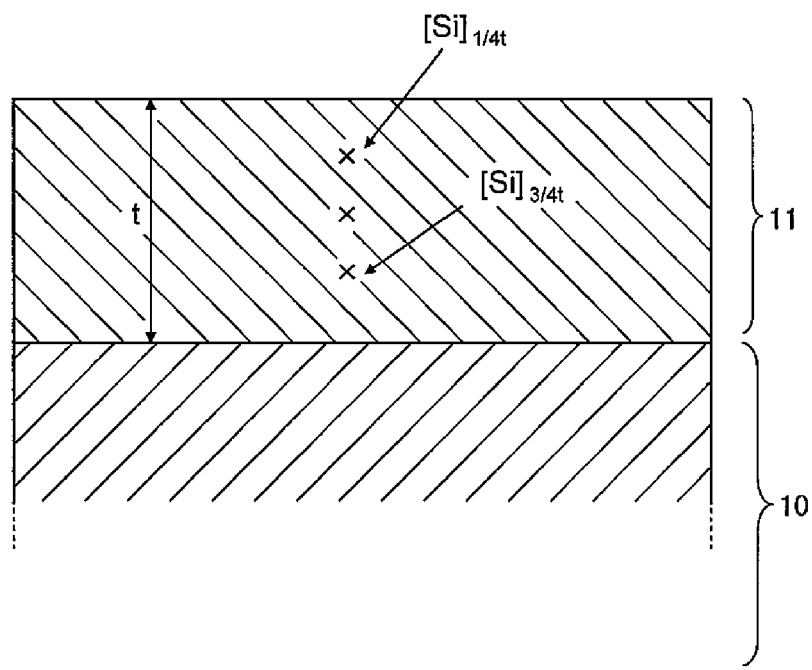
FIG. 1 is a schematic cross-sectional view showing an embodiment of the cross-section of a metal foil 10 and an organic-inorganic hybrid layer 11 according to the present invention. In the figure, the mark "x" indicates a point situated at the depth of ¾t (here, t is the thickness of the organic-inorganic hybrid layer) counted from the surface of the organic-inorganic hybrid layer, and also indicates a point situated at the depth of ¼t counted from the surface.

The first embodiment of the present invention relates to a process for producing an insulating film-coated metal foil having an organic-inorganic hybrid layer. In this process, a sol which has been obtained by compounding, in an organic solvent, a polydimethylsiloxane having an average molecular weight Mw of 900 to 10,000 or the like and a metal alkoxide or the like having one or more metals selected from: Mg, Ca, Y, Al, Sn, Ti, Zr, Nb, Ta and W may be applied onto the surface of an SUS foil, to thereby form a film.

(Polydimethylsiloxane, Etc.)

For example, polydimethylsiloxane, dimethyldialkoxysilane and dimethyldichlorosilane can be used. In view of easiness of obtaining a flexible film, the use of polydimethylsiloxane may be preferred.

The polydimethylsiloxane may have a structure, where two methyl groups are bonded to Si, and siloxanes of Si—O are linearly linked continuously. The polydimethylsiloxane may be represented by the formula: $X-[-Si(CH_3)_2-O-]_n-Si(CH_3)_2-X$, wherein X is a reactive functional group and n is the degree of polymerization. For example, in the case of a polydimethylsiloxane having a mass-average molecular weight Mw of 10,000, the number of methyl groups may be approximately from 19 to 20.

The reactive functional group (—X) may be, for example, a silanol group, a carbinol group, an amino group, an alkoxy group, a mercapto group, or an epoxy-containing functional group. The mass-average molecular weight Mw of the polydimethylsiloxane may preferably be 900 or more. If the mass-average molecular weight is less than 900, a film with a flat surface may be obtained, but when a thick film of 1 μm or more is intended to be formed, a crack can be formed so as to inhibit the film formation in some cases. For the purpose of forming a thick film of 1 μm or more, it may be preferred to use a polydimethylsiloxane having an Mw of 900 or more (for the details of the method for measuring the mass-average molecular weight Mw, for example, literature: *Kiso, Seikagaku Jikkenho* 3, *Butsurikagaku-teki Sokutei [1]* (*Fundamental Biochemical Experimental Methods* 3, *Physicochemical Measurements [1]*, edited by Koichi Anan, Kunio Konno, Zenzo Tamura, Michio Matsuhashi, and Juichiro Matsumoto, pp. 7-101, published by Maruzen, Jan. 20, 1975, may be referred to).

On the other hand, if the Mw exceeds 10,000, the polydimethylsiloxane may be viscous and may not be dissolved in a solvent, and the mixing thereof with a metal alkoxide may be impossible, whereby the preparation of a coating solution may be impossible in some cases. More preferably, the Mw may be from 950 to 3,000.

(Metal Alkoxide, Etc.)

A metal alkoxide, a metal halide and the like can be used, but from the standpoint of controlling the linking state thereof to the methylsiloxane, a metal alkoxide may be preferred. As the metal, Mg, Ca, Y, Al, Sn, Ti, Zr, Nb, Ta, W and the like can be used.

Examples of the alkoxy group OR' of the metal alkoxide $M(OR')_n$ may include, for example, a methoxy group, an ethoxy group, a propoxy group, and a butoxy group. In particular, for the purpose of effectively crosslinking the polydimethylsiloxane, the metal element of the metal alkoxide may preferably be one or more members selected from trivalent or tetravalent metal elements. That is, the metal alkoxide as mentioned above may tend to be uniformly reacted with the polydimethylsiloxane in a solution, to thereby cause no phase separation.

The metal alkoxide of Y, Al, Sn, Ti, Zr, Nb, Ta or W may have a high reactivity and therefore, an alkoxide derivative, which has been obtained by substituting a part of the alkoxy group with a chemical modifier such as β-diketone, β-ketoester, alkanolamine, alkylalkanolamine and organic acid may also be used.

(Organic Solvent)

The sol synthesis may be performed in an organic solvent. The organic solvent should have a hydroxyl group, until the metal alkoxide is hydrolyzed to be crosslinked with the polydimethylsiloxane, so as to solvate the metal alkoxide and the hydrolyzed metal alkoxide.

Examples of the organic solvent having a hydroxyl group may include: propyl alcohol ($CH_3CH_2CH_2OH$), n-butyl alcohol ($CH_3CH_2CH_2CH_2OH$), isobutyl alcohol (($CH_3)_2CHCH_2OH$), s-butyl alcohol ($CH_3CH_2CH(CH_3)OH$), n-pentyl alcohol ($CH_3(CH_2)_4OH$), isopentyl alcohol (($CH_3)_2CHCH_2CH_2OH$), neopentyl alcohol (($CH_3)_3CCH_2OH$), n-hexyl alcohol ($CH_3(CH_2)_5OH$), n-heptyl alcohol ($CH_3(CH_2)_{60}H$), n-octyl alcohol ($CH_3(CH_2)_7OH$), n-nonyl alcohol ($CH_3(CH_2)_8OH$), isononyl alcohol (($CH_3)_2CH(CH_2)_6OH$), n-decyl alcohol ($CH_3(CH_2)_9OH$), diethylene glycol monohexyl ether ($CH_3(CH_2)_5O(CH_2CH_2O)_2H$), ethylene glycol monohexyl ether ($CH_3(CH_2)_5OCH_2CH_2OH$), propylene glycol mono-n-butyl ether ($CH_3(CH_2)_3OCH_2CH(CH_3)OH$), 3,5,5-trimethyl-1-hexanol ($CH_3C(CH_3)_2CH_2CH(CH_3)CH_2CH_2OH$), 2-ethyl-1-hexanol ($CH_3(CH_2)_3CH(CH_2CH_3)CH_2OH$), isodecanol (($CH_3)_2CH(CH_2)_7OH$), etc.

(Mixing Ratio)

The mixing ratio of the dimethylsiloxane or the like with the metal alkoxide or the like may preferably be from 0.01 to 1.2 in terms of molar ratio (M/Si).

If the molar ratio M/Si is less than 0.01, the surface of the film after the formation may not be flat, but have an irregular profile. On the other hand, if the molar ratio exceeds 1.2, the film surface may be flat but crack formation may occur.

The mixing ratio may be, in terms of molar ratio M/Si, preferably from 0.02 to 1.0, more preferably from 0.05 to 0.8.

(Hydrolysis)

The hydrolysis may be performed by dissolving the precursor mentioned above in a solvent and adding water thereto. The hydrolysis may preferably be performed by adding water in a ratio of 0.5 to 2 times based on the molar number of all alkoxy groups in the starting material. If the ratio is less than 0.5 times, the hydrolysis may proceed at a low rate and the gelling may take much time. On the other hand, if it exceeds 2 times, the percentage of condensation between the metal alkoxides with each other may be increased and the contribution thereof to effective crosslinking of siloxane polymers may be reduced in some cases. The solution after the addition of water in this way may be applied as a sol onto a metal foil.

(Coating)

The method of coating a metal foil with the sol may not be particularly limited. The coating may be performed, for example, by a bar coating method, a roll coating method, a spray coating method, a dip coating method, a spin coating method, a slit coating method, or a curtain coating method, etc.

In the case where a film is formed by using a wet process as described above, and the resultant film is cured by a heat treatment, a large number of silanol (SiOH) groups may be present in the film in the wet state immediately after the film formation, but an inorganic component which has been formed by the hydrolysis/condensation reaction of the metal alkoxide in the heat treatment may be crosslinked with the polydimethylsiloxane through a chemical bond or a hydrogen bond.

In this connection, in order to achieve a more successful adherence to the organic-inorganic hybrid layer, the metal foil may be subjected to a pretreatment before the coating, as desired. Representative examples of the pretreatment may include, for example, pickling, alkali degreasing, a chemical conversion treatment with chromate or the like, grinding, polishing, and blasting. The pretreatment may be performed, as desired, by using one of these alone or by using some of them in combination.

(Metal Foil)

As the metal foil, for example, a metal foil of a material such as stainless steel (e.g., SUS304, SUS430, SUS316), common or plain steel, plated steel, copper, aluminum, nickel and titanium can be used. In the case of using a stainless steel foil as the metal foil, specific examples thereof may include: ferrite-based stainless steel foil, martensite-based stainless steel foil, austenite-based stainless steel, etc. The thermal expansion coefficient thereof may be $17 \times 10^{-6}$/K in the case of the austenite-based stainless steel, and about $10 \times 10^{-6}$/K in the case of the ferrite-based and martensite-based stainless steel. Accordingly, the ferrite-based and martensite-based stainless steels may be preferred, because the stress of the organic-inorganic hybrid layer, which is attributable to the difference in the thermal expansion coefficient, and the strain of the film on which a device is to be formed, may be reduced. The surface of the stainless steel foil may be subjected to a surface treatment such as bright annealing.

(Drying Step)

The primary purpose of a drying may be to remove the solvent in the coating film. The drying temperature may appropriately be set depending on the kind and amount of the solvent. Usually, the drying temperature may preferably be from 70 to 210° C. If the coating film is dried at a temperature of less than 70° C., the drying may take much time and a large amount of solvent may remain in the film. On the other hand, if the drying temperature exceeds 210° C., the dried film may be collapsed due to the abrupt evaporation of the solvent.

(Heat Treatment Step)

The heat treatment may be performed mainly for the purpose of allowing the curing of the coating film to proceed. Usually, the heat treatment temperature may preferably be from 250 to 600° C. If the heat treatment temperature is less than 250° C., practical strength as an insulating film may not be obtained. On the other hand, if it exceeds 600° C., the thermal decomposition of the organic group bonded to the siloxane may occur so as to impair the flexibility of the film.

In order to form the organic-inorganic hybrid layer according to the present invention in the temperature range of the heat treatment mentioned above, the coating film may be held at a temperature of 250 to 600° C. for 30 to 240 minutes in an atmosphere appearing hereinafter.

If the holding time is less than 30 minutes, a sufficient film thickness may not be obtained. On the other hand, if it exceeds 240 minutes, a crack and the like is liable to be produced.

In order to raise the temperature to the range of 250 to 600° C. from the temperature after the drying, the temperature may be raised at a temperature rise rate of 30 to 80° C./min.

In order to make up the above-mentioned structure of the organic-inorganic hybrid layer according to the present invention, the drying and heat treatment should be devised.

More specifically, the heat treatment may be controlled so as to remove the dimethylsiloxane having a small molecular weight from the film surface layer, and to reduce the amount of the siloxane (i.e., Si amount) in the film surface layer.

When the polydimethylsiloxane modified with an organic group and a metaloxane is subjected to a final heat treatment, a part of the OH groups or organic group moieties can be released therefrom and linked to another polydimethylsiloxane (i.e., dehydration condensation), and as a result, an organic-inorganic hybrid film may be obtained.

During the heat treatment, the polydimethylsiloxane film may cause another reaction due to the presence of water vapor in the heat treatment atmosphere.

When water is present in the heat treatment atmosphere, water may readily be absorbed through the film (gel film) surface so as to hydrolyze the siloxane (Si—O—Si) bond or metaloxane (Si—O-M) bond, to thereby break the polydimethylsiloxane chain. The dimethylsiloxane which has been reduced in the molecular weight thereof may be volatilized at a high temperature and therefore, the proportion of a component having a flexibility may be decreased. In particular, an oligomer having a small molecular weight, which may insufficiently be crosslinked from the beginning, may be very easily decomposed so as to make the molecular weight smaller and therefore, it may have a significant tendency to be volatilized.

We have taken our attention to such a phenomenon, and have found that an Si concentration gradient for hardening the film surface and softening the inside of the film may be created by controlling the water content in the atmosphere during the heat treatment and the temperature rise rate until the achievement of the heat treatment temperature.

That is, the film according to the present invention can be obtained by reducing the water content in the atmosphere during the heat treatment and increasing the temperature rise rate.

When the water content in the atmosphere during the heat treatment is reduced and the temperature rise rate is increased, the decomposition of the polydimethylsiloxane due to water in the film surface layer and the volatilization of the polydimethylsiloxane having a small molecular weight (notably, in the case of the volatilization of an oligomer) may be brought about. In the initial stage, the water vapor may not be abundant enough to intrude into the inside of the film and therefore, the decomposition may not occur to a certain extent in the inside the film. The polydimethylsiloxane may be changed in the heat treatment to an oxide by the hydrolysis and by the dehydration condensation reaction, which may be the original purpose of the heat treatment, and the polydimethylsiloxane in the film surface layer may be decreased thereby, but a low-molecular oligomer may be transferred from the inside of the film due to heat, so that the reaction thereof with water in the surface layer can proceed.

In this way, the proportion of the polydimethylsiloxane containing an Si component having a flexibility may be decreased in the film surface layer, and the intended film properties may be obtained.

If the temperature rise rate is not so high, the reaction in the film surface layer may not be a rapid reaction and therefore, irrespective of the water content in the atmosphere during the heat treatment, the reaction may proceed in the entirety of the film.

Therefore, water can reach the inside of the film and the reaction may not show so much a difference from that in the film surface layer. As for the Si concentration gradient in the film, the Si concentration may be lower in the surface layer, but the descending gradient may not be so steep.

If the water content in the atmosphere during the heat treatment is large and the temperature rise rate is high, a large amount of water may be consumed in the reaction on the film surface, and the decomposition of the polydimethylsiloxane in the film surface layer may extremely proceed. An oligomer may be diffused from the inside of the film, but may immediately be decomposed in the film surface layer.

As a result, a large amount of polydimethylsiloxane including an oligomer may remain in the inside of the film, and on the other hand, the polydimethylsiloxane may mostly be decomposed and volatilized in the film surface layer. The film surface layer may tend to cause a volumetric shrinkage due to a large volatilization volume, and the inside of the film may be almost free from the volumetric shrinkage, whereby a crack may readily enter from the film surface.

By use of the above measure, an organic-inorganic hybrid layer having the above-mentioned gradient in the concentration of Si may be obtained. In the conventional methods, those matters have not been taken into consideration, but the entire coating film has merely been cured through the dehydration condensation by heating.

In order to form the structure of the organic-inorganic hybrid layer according to the present invention, the drying or heat treatment may preferably be performed in a dry gas atmosphere. In particular, it may be preferred to perform the heat treatment in a dry gas atmosphere. As the dry gas, for example, it is possible to use dry air, dry nitrogen, dry argon, dry helium, and a mixed gas of these gases. Among these, a gas containing oxygen may be preferred, and examples thereof may include dry air and a dry nitrogen-oxygen mixed gas. The dry gas to be used herein may refer to a gas which has been dried so as to provide a relative humidity of 40% or less, through a desiccant such as silica gel, molecular sieve, activated carbon, calcium chloride and phosphorus pentoxide.

When a sol composition is rapidly subjected to a firing temperature, the polydimethylsiloxane may be thermally decomposed so as to be desorbed from the film surface, whereby the Si concentration may be decreased on the film surface.

The desorption of the polydimethylsiloxane refers to a loss in an organic component having a flexibility in the vicinity of the film surface. Once the desorption of the polydimethylsiloxane from the film surface occurs and the film surface is cured, it may be difficult for the polydimethylsiloxane to easily be desorbed from the surface, even when the polydimethylsiloxane has been transferred from the inside of the film. More specifically, when the temperature rise rate is increased so as to rapidly achieve the firing temperature, the polydimethylsiloxane with a large molecular weight, which is present in the inside of the film, may be prevented from sufficiently transferring to the film surface, whereby a large amount of an organic material component can be present in the inside of the film so as to maintain the soft property thereof and as a result, the Si concentration can be kept higher than that on the film surface.

Second Embodiment

The second embodiment relates to an insulating film-coated metal foil comprising at least a metal foil 10, and an organic-inorganic hybrid layer 11 disposed on one surface or both surfaces of the metal foil 10 (FIG. 1).

The concentration $[Si]_{1/4t}$ of Si at a depth of ¼t from the surface of the organic-inorganic hybrid layer along the thickness direction of the layer has the following relationship with the concentration $[Si]_{3/4t}$ of Si at a depth of ¾t from the surface of the organic-inorganic hybrid layer along the thickness direction of the layer: $[Si]_{1/4t} < [Si]_{3/4t}$; and the value of the relative ratio of the Si concentrations, $R_{Si} = ([Si]_{3/4t} - [Si]_{1/4t})/[Si]_{3/4t}$, is from 0.02 to 0.23.

Further, the ratio $A_{1/2t} = [M]_{1/2t}/[Si]_{1/2t}$ between the concentration $[Si]_{1/2t}$ of Si and the concentration $[M]_{1/2t}$ of metal element M of a metaloxane comprising a metal element except for Si at a depth of ½t from the surface of the organic-inorganic hybrid layer along the thickness direction of the layer and the ratio $A_{1/10t} = [M]_{1/10t}/[Si]_{1/10t}$ between the concentration $[Si]_{1/10t}$ of Si and the concentration $[M]_{1/10t}$ of element M of the metaloxane at a depth of 1/10t from the surface of the organic-inorganic hybrid layer along the thickness direction of the layer may have the relationship of $1.0 \times A_{1/2t} < A_{1/10t} < 2.0 \times A_{1/2t}$.

(Gradient of Si Concentration)

In the present invention, a gradient is provided to the concentration of Si in the thickness direction of the insulating layer (insulating film) disposed on one surface or both surfaces of the metal foil, and the gradient is created such that the concentration of Si is decreased at a specific rate in the direction from the metal foil side toward the surface of the layer. The present invention may be characterized in that an Si concentration gradient decreasing at such a specific rate is provided in the thickness direction of the organic-inorganic hybrid layer (insulating layer).

More specifically, as shown in FIG. 1, the concentration $[Si]_{1/4t}$ of Si at a depth of ¼t from the surface of the organic-inorganic hybrid layer 11 along the thickness t direction of the layer has a relationship of $[Si]_{1/4t} < [Si]_{3/4t}$ with the concentration $[Si]_{3/4t}$ of Si at a depth of ¾t from the surface of the organic-inorganic hybrid layer 11 along the thickness t direction of the layer, and at the same time, the relative ratio of these Si concentrations, $R_{Si} = ([Si]_{3/4t} - [Si]_{1/4t})/[Si]_{3/4t}$, is from 0.02 to 0.23.

Figure 2:
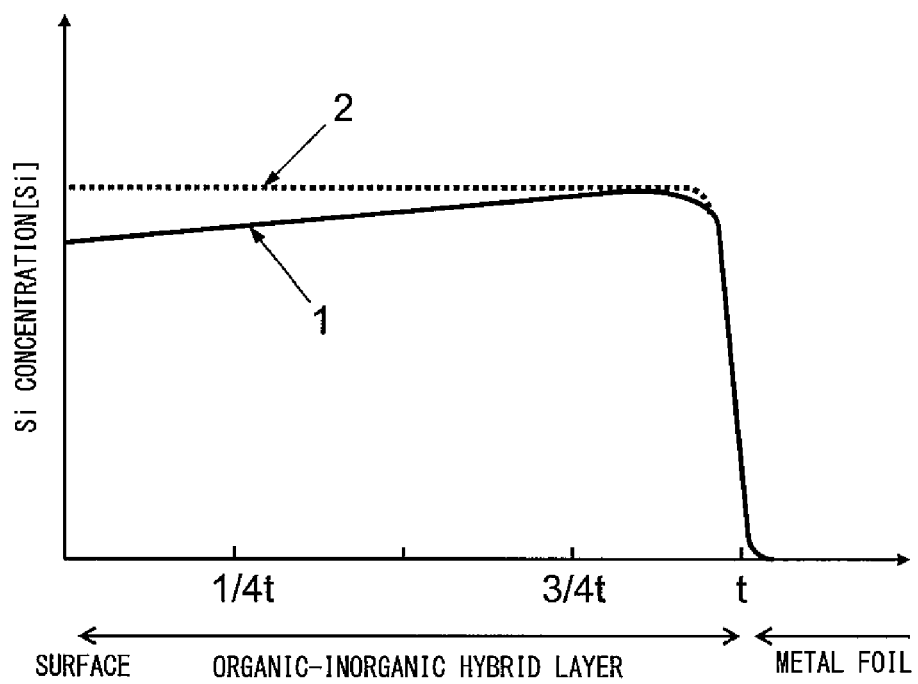
FIG. 2 is a graph showing an example of the change in the [Si] concentration along the cross-section of the organic-inorganic hybrid layer. In this graph, "curve 1" shows an example of the profile of the organic-inorganic hybrid layer according to the present invention, and "curve 2" shows an example of the profile of the conventional organic-inorganic hybrid layer.

As mentioned above, when the above gradient (for example, the gradient as shown in the graph of FIG. 2) is provided to the Si concentration in the depth direction in the organic-inorganic hybrid layer 11, the layer may have a tendency that in the depth direction, the metal foil 10 side of the hybrid layer 11 is soft and the surface side of the layer 11 is hard. Accordingly, the hybrid layer 11 may be resistant to scratching, because of the hard surface of the hybrid layer 11. However, the entirety of the layer 11 may not become hard, and since the inside thereof on the metal foil side may be soft, the coated metal foil can be used as a so-called flexible substrate, in which the hybrid layer 11 can conform to the deformation of the metal foil 10, even when the metal foil 10 is deformed. In the case of the conventional merely "hard film", it may have a tendency to cause a crack during the film formation. However, in the case of the insulating film 11 according to the present invention, the inside thereof may be soft and therefore, even at time of the film formation, the crack formation may be significantly suppressed.

According to the knowledge according to the present inventors, the reason why the flexibility (hardness) of the layer differs as mentioned above, when the Si concentration in the hybrid layer 11 has a gradient, may be presumed as follows.

Thus, one reason may be presumed that, in an organic-inorganic hybrid containing dimethylsiloxane —O—Si$(CH_3)_2$—O— and a metaloxane $M(O—)_n$ comprising a metal element other than Si, dimethylsiloxane mainly contributes to the development of the flexibility, and that the curing is achieved by the crosslinking action of the metaloxane. For this reason, there may be a tendency that when the concentration of Si becomes high (that is, the proportion of dimethylsiloxane is increased), the pertinent portion of the hybrid layer 11 tends to have a high flexibility, and when the concentration of Si becomes low (that is, the proportion of dimethylsiloxane is decreased), the pertinent portion of the hybrid layer 11 tends to become hard.

In the prior art, as the organic-inorganic hybrid film, only a film of the same composition as the composition of the raw material or a film of a composition having a constant relationship with the composition of the raw material has been produced, and efforts have been made to obtain a uniform composition without changing the composition in the thickness direction of the film.

The present inventors have found that the Si concentration can be changed in the depth direction of the organic-inorganic hybrid film, and also found that when the above-mentioned conditions are satisfied, the surface of the film is resistant to scratching, and the film also has a flexibility which is usable as a flexible substrate.

As mentioned above, in the present invention, when the relative ratio $R_{Si}=([Si]_{3/4t}-[Si]_{1/4t})/[Si]_{3/4t}$ is from 0.02 to 0.23, the above-mentioned operations and effects may be obtained.

If the relative ratio $R_{Si}$ is less than 0.02, the gradient of the Si concentration may be too small and therefore, the soft composition may allow for easy scratching on the surface, but the hard composition may cause crack formation or separation, when the metal foil is bent. Further, the film formation of a hard composition may tend to generate a crack. On the other hand, if the relative ratio $R_{Si}$ exceeds 0.23, the difference between the soft region and the hard region may become too large. In this case, the curing by the metaloxane may not sufficiently proceed in the soft region, to thereby provide a tendency that the adherence between the coating and the metal foil may not be satisfactorily ensured, or the heat resistance or stability of the coating may not be sufficient. Further, in order to set to the above-mentioned difference, it is inevitable to make the hard region extremely hard, and a phenomenon that the hard portion cracks is liable to occur, when it is subjected to an impact.

The value of the relative ratio $R_{Si}$ may preferably be from 0.02 to 0.23 and in view of surface hardness, more preferably from 0.03 to 0.10.

(Ratio of Concentration of Element M)

Figure 3:
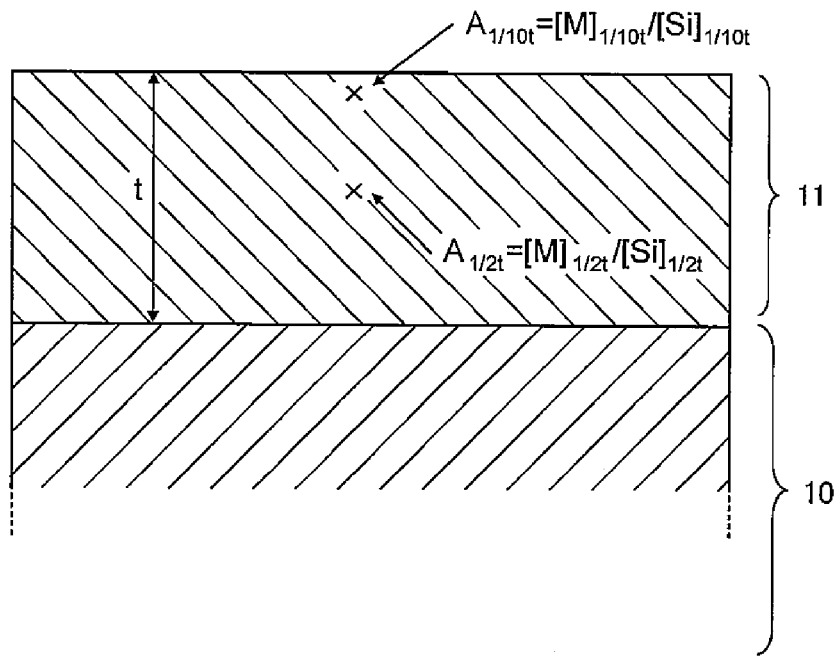
FIG. 3 is a schematic cross-sectional view showing an embodiment of the cross-section of the organic-inorganic hybrid layer according to the present invention. This figure also shows [M]/[Si] concentration ratios at the point indicated by the mark "x" in the figure (i.e., the point situated at the ½t depth from the surface and the point situated at the ¹⁄₁₀t depth from the surface).

In the present invention, in addition to the Si concentration gradient, the ratio of the concentration of element M of a metaloxane to the concentration of Si may be set high near the surface in the depth direction, whereby the surface can be more resistant to scratching. More specifically, as shown in the schematic cross-sectional view of FIG. 3, the ratio $A_{1/2t}=[M]_{1/2t}/[Si]_{1/2t}$ between the concentration $[Si]_{1/2t}$ of Si and the concentration $[M]_{1/2t}$ of element M of a metaloxane at a depth of ½ from the surface of the organic-inorganic hybrid layer 11 along the thickness direction of the layer and the ratio $A_{1/10t}=[M]_{1/10t}/[Si]_{1/10t}$ between the concentration $[Si]_{1/10t}$ of Si and the concentration $[M]_{1/10t}$ of element M of the metaloxane at a depth of 1/10 from the surface of the organic-inorganic hybrid layer along the thickness direction of the layer may preferably have the following relationship:

$$1.0 \times A_{1/2t} \leq A_{1/10t} \leq 2.0 \times A_{1/2t}.$$

The relationship of these ratios may more preferably be as follows:

$$1.2 \times A_{1/2t} \leq A_{1/10t} \leq 1.5 \times A_{1/2t}.$$

Figure 4:
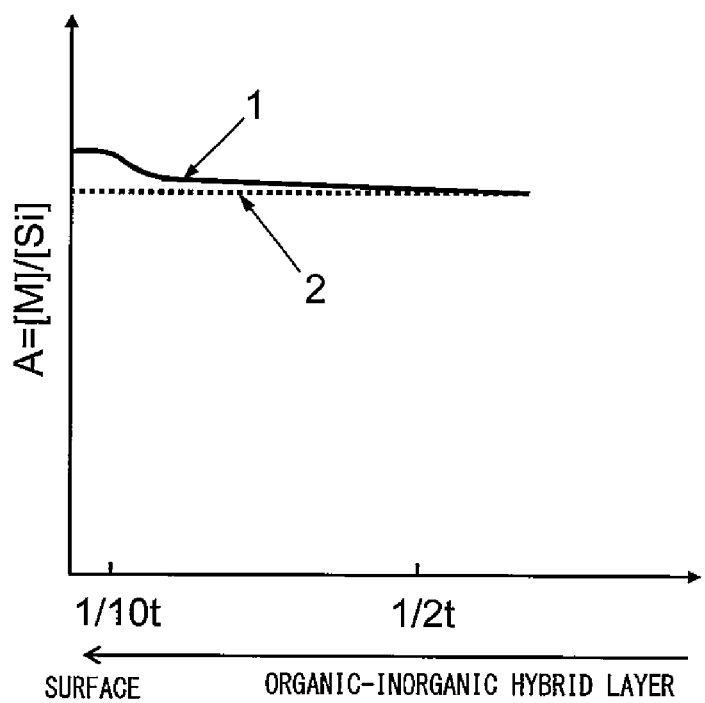
FIG. 4 is a graph showing an example of the change in the A=[M]/[Si] concentration ratio in the cross-section of the organic-inorganic hybrid layer in an embodiment of the present invention.

In the present invention, a representative position near the surface may be located at a depth of 1/10t from the surface of the layer 11. Further, whether the concentration ratio near the surface is large or small may be judged based on the concentration ratio in the central part of the layer in the depth direction (that is, at a depth of ½t from the surface of the layer 11). Accordingly, when the concentration ratio of element M of the metaloxane based on the concentration of Si is increased such that the value of the concentration ratio $A_{1/10t}$ near the surface becomes 1.0 times or more the basic concentration ratio $A_{1/2t}$ in the central part (FIG. 4), the crosslinking action by the metaloxane has proceeded in the vicinity of the surface, and therefore the surface of the organic-inorganic hybrid layer may be more resistant to scratching. For this reason, if the value of the concentration ratio $A_{1/10t}$ near the surface is less than $1.0 \times A_{1/2t}$ the above-mentioned operations and effects may not be satisfactorily obtained in some cases. On the other hand, as the value of the concentration ration $A_{1/10t}$ near the surface is larger, the surface may be more resistant to scratching, but if the value exceeds $2.0 \times A_{1/2t}$, crosslinking by the metaloxane may proceed excessively to excessively harden the surface of the organic-inorganic hybrid layer and a crack is liable to occur in some cases.

(Molar Ratio M/Si)

With respect to Si content and M content in the organic-inorganic hybrid layer, the molar ratio M/Si may preferably be from 0.01 to 1.2. The molar ratio M/Si may more preferably be from 0.02 to 1.0, still more preferably from 0.05 to 0.8.

(Concentrations of Si and M)

The concentration of Si or M can be measured as follows. As for the component analysis in the depth direction of the organic-inorganic hybrid layer, the component according to the depth of the layer can be measured by gradually digging down the layer from the surface with the discharge of Ar gas in a glow discharge mass analysis GDS (for example, GDA750 manufactured by Rigaku Corporation).

(Thickness of Hybrid Layer)

In the present invention, usually, the thickness t of the organic-inorganic hybrid layer may preferably be from 0.5 to 20 μm. If the thickness t is less than 0.5 μm, the insulating property may be insufficient because of the problem in the stability of film thickness. On the other hand, if the thickness t exceeds 20 μm, unless an organic component of the film is increased to a fairly large amount, a crack may readily be produced. In such a case, the film surface is liable to become soft and easy to be scratched, and the cost therefor may rise. The thickness t may more preferably be from 1.0 to 15 μm, still more preferably from 1.5 to 10 μm.

The thickness t of the organic-inorganic hybrid layer can be measured by observing a film, which has been obtained after the heat treatment thereof, from the cross-sectional direction of the layer and the metal foil by using a scanning electron microscope (for example, JSM-6500F manufactured by JEOL). Further, based on the measured value of the thickness t, the depth axis of an [Si] concentration profile (see, FIG. 1) in GDS as mentioned above may be determined by assigning the interface between the organic-inorganic hybrid layer and the metal foil to the inflection point in the concentration profile.

(Metal Foil)

The metal foil to be used in the present invention may be generally preferably a thin metal sheet having a thickness of from 0.01 to 0.60 mm. The thickness of the metal foil may more preferably be from 0.02 to 0.3 μm, still more preferably from 0.03 to 0.12 μm. The metal constituting the metal foil may not particularly be limited in its kind, but examples thereof may include a stainless steel (e.g., SUS304, SUS430, SUS316), a common steel, a plated steel, copper, aluminum, nickel, titanium, etc.

Examples

Coating Solution A

A metal alkoxide was used as the precursor of metaloxane, and a polydimethylsiloxane was used as the precursor of dimethylsiloxane. The metal alkoxide used herein had been obtained by mixing 8 mol of titanium tetraisopropoxide and 16 mol of ethyl 3-oxobutanoate as a chemical modifier therefor, the amount of which was twice the amount of titanium tetraisopropoxide. To the chemically-modified titanium alkoxide, 2.5 mol of a polydimethylsiloxane having a mass-average molecular weight of 3,000 (with the terminal group being silanol) was added. After 1 mol of 1-butanol as a solvent for adjusting the viscosity was added to the mixed solution, 5 mol of $H_2O$ was added thereto so as to cause hydrolysis, whereby Coating Solution A was prepared.

Coating Solution B

A metal alkoxide was used as the precursor of metaloxane, and a polydimethylsiloxane was used as the precursor of dimethylsiloxane. The metal alkoxide used herein had been obtained by mixing 2 mol of titanium tetraisopropoxide and 4 mol of ethyl 3-oxobutanoate as a chemical modifier therefor, the amount of which was twice the amount of titanium tetraisopropoxide. To the chemically-modified titanium alkoxide, 0.5 mol of a polydimethylsiloxane having a mass-average molecular weight of 1,800 (with the terminal group being silanol) was added. After 2 mol of 1-butanol as a solvent for adjusting the viscosity was added to the mixed solution, 2 mol of $H_2O$ was added thereto so as to cause hydrolysis, whereby Coating Solution B was prepared.

Coating Solution C

A metal alkoxide was used as the precursor of metaloxane, and a polydimethylsiloxane was used as the precursor of dimethylsiloxane. The metal alkoxide used herein had been obtained by mixing 8 mol of titanium tetraisopropoxide and 12 mol of ethyl 3-oxobutanoate as a chemical modifier therefor, the amount of which was twice the amount of titanium tetraisopropoxide. To the chemically-modified titanium alkoxide, 2 mol of a polydimethylsiloxane having a mass-average molecular weight of 4,500 (with the terminal group being silanol) was added. After 1 mol of 1-butanol as a solvent for adjusting the viscosity was added to the mixed solution, 2 mol of $H_2O$ was added thereto so as to cause hydrolysis, whereby Coating Solution C was prepared.

Coating Solution D

A metal alkoxide was used as the precursor of metaloxane, and a polydimethylsiloxane was used as the precursor of dimethylsiloxane. The metal alkoxide used used herein had been obtained by mixing 3 mol of aluminum tri-sec-butoxide and 6.75 mol of ethyl 3-oxobutanoate as a chemical modifier therefor. To the chemically-modified aluminum alkoxide, 1 mol of a polydimethylsiloxane having a mass-average molecular weight of 3,000 (with the terminal group being silanol) was added. After 10 mol of 1-butanol as a solvent for adjusting the viscosity was added to the mixed solution, 2 mol of $H_2O$ was added thereto so as to cause hydrolysis, whereby Coating Solution D was prepared.

Coating Solution E

A metal alkoxide was used as the precursor of metaloxane, and a polydimethylsiloxane was used as the precursor of dimethylsiloxane. The metal alkoxide used herein had been obtained by mixing 2.5 mol of zirconium tetra-n-butoxide and 5 mol of ethyl 3-oxobutanoate as a chemical modifier therefor. To the chemically-modified aluminum alkoxide, 1 mol of a polydimethylsiloxane having a mass-average molecular weight of 3,000 (with the terminal group being silanol) was added. After 3 mol of 1-butanol as a solvent for adjusting the viscosity was added to the mixed solution, 1 mol of $H_2O$ was added thereto so as to cause hydrolysis, whereby Coating Solution E was prepared.

Coating Solution F

A metal alkoxide was used as the precursor of metaloxane, and a dimethyldialkoxysilane was used as the precursor of dimethylsiloxane. The metal alkoxide used herein had been obtained by mixing 2 mol of titanium tetraisopropoxide and 4 mol of ethyl 3-oxobutanoate as a chemical modifier therefor, which was twice the amount of titanium tetraisopropoxide. On the other hand, for the dimethyldialkoxysilane, dimethyldimethoxysilane was used and previously subjected to hydrolysis and polycondensation by adding thereto $H_2O$ in an amount of 1.5 molar times that of the alkoxy group. To the chemically-modified titanium alkoxide, the hydrolysate/polycondensate of dimethyldimethoxysilane was added in a ratio of 30 in terms of Si/Ti molar ratio. After 2 mol of 1-butanol as a solvent for adjusting the viscosity was added to the mixed solution, 2 mol of $H_2O$ was further added thereto so as to cause hydrolysis, whereby Coating Solution F was prepared.

Coating Solution G

A metal alkoxide was used as the precursor of metaloxane, and a polydimethylsiloxane was used as the precursor of dimethylsiloxane. The metal alkoxide used herein had been obtained by mixing 3 mol of yttrium isopropoxide and 6 mol of ethyl 3-oxobutanoate as a chemical modifier therefor. To the chemically-modified yttrium alkoxide, 1 mol of a polydimethylsiloxane having a mass-average molecular weight of 3,000 (with the terminal group being silanol) was added. After 2 mol of 1-butanol as a solvent for adjusting the viscosity was added to the mixed solution, 2 mol of $H_2O$ was added thereto so as to cause hydrolysis, whereby Coating Solution G was prepared.

Coating Solution H

A metal alkoxide was used as the precursor of metaloxane, and a polydimethylsiloxane was used as the precursor of dimethylsiloxane. The metal alkoxide used herein had been obtained by mixing 4 mol of niobium(V)-n-butoxide and 8 mol of ethyl 3-oxobutanoate as a chemical modifier therefor. To the chemically-modified niobium alkoxide, 1.5 mol of a polydimethylsiloxane having a mass-average molecular weight of 3,000 (with the terminal group being silanol) was added. After 4 mol of 1-butanol as a solvent for adjusting the viscosity was added to the mixed solution, 2 mol of $H_2O$ was added thereto so as to cause hydrolysis, whereby Coating Solution H was prepared.

[Formation of Organic-Inorganic Hybrid Layer]

Each of the coating solutions which had been prepared by the procedure mentioned above, was applied onto an SUS430 metal foil by a using slit coater. As for the coating conditions of the slit coater, the gap at the time of contact thereof with the liquid was 50 μm, and the gap thereof at the time of coating was 100 μm. The coating was performed at a coating speed of 100 mm/sec.

After the coating, the drying for evaporating the solvent was performed at 150° C. for 10 minutes in the atmosphere as shown in Tables 1 to 8 appearing hereinafter. Thereafter, heat treatment was performed under the conditions of temperature, time and atmosphere shown in Tables 1 to 8.

In the Tables, "air" is an atmosphere at an ordinary temperature and a relative humidity of 60% or more, and "dry air" and "dry nitrogen" are an atmosphere at an ordinary temperature and a relative humidity of 40% or less.

(Concentration of Each Element and Measurement of Thickness)

The concentration of each element in the cross-section (in the depth direction) of the organic-inorganic hybrid layer was analyzed, similarly to that mentioned above, by using a glow discharge mass analysis GDS (GDA750 manufactured by Rigaku Corporation). Further, the thickness t of the organic-inorganic hybrid layer was measured, similarly to that mentioned above, by using a scanning electron microscope (JSM-6500F manufactured by JEOL) and determined.

The surface hardness of the organic-inorganic hybrid layer formed on the metal foil as mentioned above was evaluated by a pencil hardness tester in accordance with JIS K5600-5-4.

Further, the adherence and bending conformability of the organic-inorganic hybrid layer were evaluated by winding the metal foil after heat treatment and film formation around a cylindrical bar of 50 mmϕ and observing the presence or absence of a crack in the surface of the layer by using a scanning electron microscope (JSM-6500F manufactured by JEOL).

Judgment was performed as follows.

Rating of D was a film where a crack was generated by folding/bending or a film where the film surface hardness was too soft (surface pencil hardness of 2B or less).

Rating of C was a film where a crack was not generated by folding/bending but the surface hardness was as high as 2H and was a hardness probably capable of causing crack formation.

Rating of B was a film where the surface pencil hardness was B and the surface was quite soft.

Rating of A was a film where crack formation was not caused and the surface hardness was good (i.e., from H to HB).

The evaluation results are shown in Tables 1 to 8.

TABLE 1

(Coating Solution A)
Table 1: Coating Solution A

| No. | | Mass-average Molecular Weight of Poly-dimethyl-siloxane | Metal Element of Metal Alkoxide | Conditions of Heat Treatment After Coating and Drying | | | Thickness of Organic-Inorganic Hybrid Layer (μm) |
|---|---|---|---|---|---|---|---|
| | | | | Drying Atmosphere | Temperature, Time | Atmosphere | |
| 1 | Example | 3000 | Ti | air | 360° C., 1 hr | dry air | 4.5 |
| 2 | Example | 3000 | Ti | air | 350° C., 1 hr | dry air | 4.9 |
| 3 | Example | 3000 | Ti | air | 350° C., 1 hr | dry air | 4.7 |
| 4 | Example | 3000 | Ti | air | 320° C., 1 hr | dry nitrogen | 5.2 |
| 5 | Example | 3000 | Ti | air | 320° C., 1 hr | dry air | 5.4 |
| 6 | Example | 3000 | Ti | air | 320° C., 1 hr | dry (nitrogen 50%, oxygen 50%) | 5.4 |
| 7 | Example | 3000 | Ti | air | 320° C., 1 hr | dry (nitrogen 90%, oxygen 10%) | 5.3 |
| 8 | Example | 3000 | Ti | dry air | 320° C., 1 hr | dry air | 5.4 |
| 9 | Example | 3000 | Ti | dry air | 320° C., 1 hr | dry air | 5.4 |
| 10 | Example | 3000 | Ti | air | 280° C., 1 hr | air | 3.5 |
| 11 | Example | 3000 | Ti | air | 280° C., 1 hr | dry air | 6.8 |
| 12 | Example | 3000 | Ti | air | 280° C., 1 hr | dry air | 6.5 |
| 13 | Comparative Example | 3000 | Ti | air | 360° C., 1 hr | air | 2.7 |
| 14 | Comparative Example | 3000 | Ti | air | 350° C., 1 hr | air | 2.9 |
| 15 | Comparative Example | 3000 | Ti | air | 320° C., 1 hr | air | 3.4 |
| 16 | Comparative Example | 3000 | Ti | air | 320° C., 1 hr | nitrogen | 3.6 |
| 17 | Comparative Example | 3000 | Ti | air | 240° C., 1 hr | air | 3.8 |
| 18 | Comparative Example | 3000 | Ti | air | 240° C., 1 hr | dry air | 7.2 |

TABLE 1-continued (Coating Solution A)
Table 1: Coating Solution A

| No. | | $([Si]_{3/4t} - [Si]_{1/4t})/[Si]_{3/4t}$ | $A_{1/2t}$ | $A_{1/10t}$ | $2 \times A_{1/2t}$ | Surface Hardness | Presence of Absence of Crack in Bending Test | Judgment |
|---|---|---|---|---|---|---|---|---|
| 1 | Example | 0.085 | 0.145 | 0.140 | 0.290 | 2H | none | C |
| 2 | Example | 0.074 | 0.098 | 0.087 | 0.196 | 2H | none | C |
| 3 | Example | 0.052 | 0.085 | 0.121 | 0.170 | H | none | A |
| 4 | Example | 0.105 | 0.045 | 0.052 | 0.090 | H | none | A |
| 5 | Example | 0.122 | 0.038 | 0.062 | 0.076 | H | none | A |
| 6 | Example | 0.083 | 0.052 | 0.062 | 0.104 | F | none | A |
| 7 | Example | 0.075 | 0.037 | 0.058 | 0.074 | F | none | A |
| 8 | Example | 0.065 | 0.047 | 0.062 | 0.094 | HB | none | A |
| 9 | Example | 0.086 | 0.061 | 0.118 | 0.122 | HB | none | A |
| 10 | Example | 0.092 | 0.035 | 0.043 | 0.070 | F | none | A |
| 11 | Example | 0.163 | 0.043 | 0.092 | 0.086 | B | none | B |
| 12 | Example | 0.184 | 0.032 | 0.073 | 0.064 | B | none | B |
| 13 | Comparative Example | 0.005 | 0.138 | 0.130 | 0.276 | 3H | formed | D |
| 14 | Comparative Example | 0.007 | 0.124 | 0.251 | 0.248 | 3H | formed | D |
| 15 | Comparative Example | 0.018 | 0.087 | 0.185 | 0.174 | 2H | formed | D |
| 16 | Comparative Example | 0.012 | 0.075 | 0.231 | 0.150 | 2H | formed | D |
| 17 | Comparative Example | 0.009 | 0.025 | 0.055 | 0.050 | 3B | none | D |
| 18 | Comparative Example | 0.009 | 0.039 | 0.035 | 0.078 | 2B | none | D |

TABLE 2

(Coating Solution B)
Table 2: Coating Solution B

| No. | | Mass-average Molecular Weight of Polydimethyl-siloxane | Metal Element of Metal Alkoxide | Conditions of Heat Treatment After Coating and Drying | | | Thickness of Organic-Inorganic Hybrid Layer (μm) |
|---|---|---|---|---|---|---|---|
| | | | | Drying Atmosphere | Temperature, Time | Atmosphere | |
| 1 | Example | 1800 | Ti | air | 350° C., 1 hr | dry air | 1.6 |
| 2 | Example | 1800 | Ti | air | 320° C., 1 hr | air | 1.3 |
| 3 | Example | 1800 | Ti | air | 320° C., 1 hr | nitrogen | 1.4 |
| 4 | Example | 1800 | Ti | air | 320° C., 1 hr | dry nitrogen | 2.2 |
| 5 | Example | 1800 | Ti | air | 320° C., 1 hr | dry air | 2.3 |
| 6 | Example | 1800 | Ti | air | 320° C., 1 hr | dry (nitrogen 50%, oxygen 50%) | 2.2 |
| 7 | Example | 1800 | Ti | air | 320° C., 1 hr | dry (nitrogen 90%, oxygen 10%) | 2.1 |
| 8 | Example | 1800 | Ti | dry air | 320° C., 1 hr | dry air | 2.3 |
| 9 | Example | 1800 | Ti | dry air | 320° C., 1 hr | dry air | 2.4 |
| 10 | Example | 1800 | Ti | air | 280° C., 1 hr | air | 2.2 |
| 11 | Example | 1800 | Ti | air | 280° C., 1 hr | dry air | 3.5 |
| 12 | Example | 1800 | Ti | air | 280° C., 1 hr | dry air | 3.2 |
| 13 | Comparative Example | 1800 | Ti | air | 360° C., 1 hr | air | 0.8 |
| 14 | Comparative Example | 1800 | Ti | air | 360° C., 1 hr | dry air | 1.4 |
| 15 | Comparative Example | 1800 | Ti | air | 350° C., 1 hr | air | 1.1 |
| 16 | Comparative Example | 1800 | Ti | air | 350° C., 1 hr | dry air | 1.5 |
| 17 | Comparative Example | 1800 | Ti | air | 240° C., 1 hr | air | 3.0 |
| 18 | Comparative Example | 1800 | Ti | air | 240° C., 1 hr | dry air | 4.2 |

TABLE 2-continued (Coating Solution B)
Table 2: Coating Solution B

| No. | | $([Si]_{3/4t} - [Si]_{1/4t})/[Si]_{3/4t}$ | $A_{1/2t}$ | $A_{1/10t}$ | $2 \times A_{1/2t}$ | Surface Hardness | Presence of Absence of Crack in Bending Test | Judgment |
|---|---|---|---|---|---|---|---|---|
| 1 | Example | 0.021 | 0.128 | 0.122 | 0.256 | 2H | none | C |
| 2 | Example | 0.022 | 0.133 | 0.130 | 0.266 | 2H | none | C |
| 3 | Example | 0.024 | 0.141 | 0.137 | 0.282 | 2H | none | C |
| 4 | Example | 0.032 | 0.131 | 0.135 | 0.262 | H | none | A |
| 5 | Example | 0.045 | 0.145 | 0.156 | 0.290 | F | none | A |
| 6 | Example | 0.036 | 0.142 | 0.152 | 0.284 | H | none | A |
| 7 | Example | 0.042 | 0.136 | 0.142 | 0.272 | F | none | A |
| 8 | Example | 0.049 | 0.134 | 0.148 | 0.268 | HB | none | A |
| 9 | Example | 0.048 | 0.149 | 0.159 | 0.298 | F | none | A |
| 10 | Example | 0.064 | 0.098 | 0.092 | 0.196 | HB | none | A |
| 11 | Example | 0.072 | 0.085 | 0.096 | 0.170 | B | none | B |
| 12 | Example | 0.068 | 0.088 | 0.102 | 0.176 | B | none | B |
| 13 | Comparative Example | 0.002 | 0.152 | 0.145 | 0.304 | 3H | formed | D |
| 14 | Comparative Example | 0.003 | 0.138 | 0.126 | 0.276 | 3H | formed | D |
| 15 | Comparative Example | 0.018 | 0.147 | 0.132 | 0.294 | 3H | formed | D |
| 16 | Comparative Example | 0.017 | 0.142 | 0.135 | 0.284 | 3H | formed | D |
| 17 | Comparative Example | 0.018 | 0.042 | 0.091 | 0.084 | 2B | none | D |
| 18 | Comparative Example | 0.015 | 0.038 | 0.083 | 0.076 | 2B | none | D |

TABLE 3

(Coating Solution C)
Table 3: Coating Solution C

| No. | | Mass-average Molecular Weight of Polydimethylsiloxane | Metal Element of Metal Alkoxide | Conditions of Heat Treatment After Coating and Drying | | | Thickness of Organic-Inorganic Hybrid Layer (μm) |
|---|---|---|---|---|---|---|---|
| | | | | Drying Atmosphere | Temperature, Time | Atmosphere | |
| 1 | Example | 4500 | Ti | air | 350° C., 1 hr | dry air | 6.4 |
| 2 | Example | 4500 | Ti | air | 320° C., 1 hr | air | 3.4 |
| 3 | Example | 4500 | Ti | air | 320° C., 1 hr | nitrogen | 3.2 |
| 4 | Example | 4500 | Ti | air | 320° C., 1 hr | dry nitrogen | 7.0 |
| 5 | Example | 4500 | Ti | air | 320° C., 1 hr | dry air | 7.2 |
| 6 | Example | 4500 | Ti | air | 320° C., 1 hr | dry (nitrogen 50%, oxygen 50%) | 7.1 |
| 7 | Example | 4500 | Ti | air | 320° C., 1 hr | dry (nitrogen 90%, oxygen 10%) | 7.0 |
| 8 | Example | 4500 | Ti | dry air | 320° C., 1 hr | dry air | 7.3 |
| 9 | Example | 4500 | Ti | dry air | 320° C., 1 hr | dry air | 7.2 |
| 10 | Example | 4500 | Ti | air | 280° C., 1 hr | air | 4.1 |
| 11 | Example | 4500 | Ti | air | 280° C., 1 hr | dry air | 8.4 |
| 12 | Comparative Example | 4500 | Ti | air | 360° C., 1 hr | air | 2.9 |
| 13 | Comparative Example | 4500 | Ti | air | 360° C., 1 hr | dry air | 6.2 |
| 14 | Comparative Example | 4500 | Ti | air | 350° C., 1 hr | air | 3.1 |
| 15 | Comparative Example | 4500 | Ti | air | 350° C., 1 hr | dry air | 6.5 |

TABLE 3-continued (Coating Solution C)

| No. | | Mass-average Molecular Weight | Metal Element | Drying Atmosphere | Temperature, Time | Atmosphere | Thickness |
|---|---|---|---|---|---|---|---|
| 16 | Comparative Example | 4500 | Ti | air | 280° C., 1 hr | dry air | 8.2 |
| 17 | Comparative Example | 4500 | Ti | air | 240° C., 1 hr | air | 4.3 |
| 18 | Comparative Example | 4500 | Ti | air | 240° C., 1 hr | dry air | 9.2 |

| No. | | $([Si]_{3/4t} - [Si]_{1/4t})/[Si]_{3/4t}$ | $A_{1/2t}$ | $A_{1/10t}$ | $2 \times A_{1/2t}$ | Surface Hardness | Presence of Absence of Crack in Bending Test | Judgment |
|---|---|---|---|---|---|---|---|---|
| 1 | Example | 0.128 | 0.048 | 0.252 | 0.096 | H | none | A |
| 2 | Example | 0.115 | 0.028 | 0.065 | 0.056 | H | none | A |
| 3 | Example | 0.128 | 0.031 | 0.025 | 0.062 | H | none | A |
| 4 | Example | 0.162 | 0.032 | 0.042 | 0.064 | F | none | A |
| 5 | Example | 0.113 | 0.035 | 0.043 | 0.070 | F | none | A |
| 6 | Example | 0.122 | 0.032 | 0.042 | 0.064 | HB | none | A |
| 7 | Example | 0.138 | 0.035 | 0.043 | 0.070 | F | none | A |
| 8 | Example | 0.142 | 0.032 | 0.042 | 0.064 | HB | none | A |
| 9 | Example | 0.153 | 0.035 | 0.043 | 0.070 | F | none | A |
| 10 | Example | 0.141 | 0.024 | 0.053 | 0.048 | B | none | B |
| 11 | Example | 0.189 | 0.041 | 0.088 | 0.082 | B | none | B |
| 12 | Comparative Example | 0.240 | 0.038 | 0.082 | 0.076 | 2H | formed | D |
| 13 | Comparative Example | 0.321 | 0.032 | 0.075 | 0.064 | 2H | formed | D |
| 14 | Comparative Example | 0.247 | 0.028 | 0.065 | 0.056 | H | formed | D |
| 15 | Comparative Example | 0.253 | 0.035 | 0.042 | 0.070 | H | formed | D |
| 16 | Comparative Example | 0.242 | 0.052 | 0.062 | 0.104 | 2B | none | D |
| 17 | Comparative Example | 0.316 | 0.031 | 0.069 | 0.062 | 3B | none | D |
| 18 | Comparative Example | 0.245 | 0.027 | 0.065 | 0.054 | 4B | none | D |

TABLE 4

(Coating Solution D)

| No. | | Mass-average Molecular Weight of Polydimethylsiloxane | Metal Element of Metal Alkoxide | Drying Atmosphere | Temperature, Time | Atmosphere | Thickness of Organic-Inorganic Hybrid Layer (μm) |
|---|---|---|---|---|---|---|---|
| 1 | Example | 3000 | AL | air | 350° C., 1 hr | dry air | 1.0 |
| 2 | Example | 3000 | AL | air | 350° C., 1 hr | dry air | 0.9 |
| 3 | Example | 3000 | AL | air | 320° C., 1 hr | air | 1.5 |
| 4 | Example | 3000 | AL | air | 320° C., 1 hr | nitrogen | 1.7 |
| 5 | Example | 3000 | AL | air | 320° C., 1 hr | dry nitrogen | 2.1 |
| 6 | Example | 3000 | AL | air | 320° C., 1 hr | dry air | 2.3 |
| 7 | Example | 3000 | AL | air | 320° C., 1 hr | dry (nitrogen 50%, oxygen 50%) | 2.2 |
| 8 | Example | 3000 | AL | air | 320° C., 1 hr | dry (nitrogen 90%, oxygen 10%) | 2.1 |
| 9 | Example | 3000 | AL | dry air | 320° C., 1 hr | dry air | 2.2 |
| 10 | Example | 3000 | AL | Dry air | 320° C., 1 hr | dry air | 2.2 |
| 11 | Example | 3000 | AL | air | 280° C., 1 hr | air | 1.8 |
| 12 | Example | 3000 | AL | air | 280° C., 1 hr | dry air | 3.2 |
| 13 | Comparative Example | 3000 | AL | air | 360° C., 1 hr | air | 0.5 |
| 14 | Comparative Example | 3000 | AL | air | 360° C., 1 hr | dry air | 0.8 |

TABLE 4-continued (Coating Solution D)
Table 4: Coating Solution D

| No. | | | | | | | |
|---|---|---|---|---|---|---|---|
| 15 | Comparative Example | 3000 | AL | air | 350° C., 1 hr | air | 0.6 |
| 16 | Comparative Example | 3000 | AL | air | 280° C., 1 hr | dry air | 3.4 |
| 17 | Comparative Example | 3000 | AL | air | 240° C., 1 hr | air | 2.4 |
| 18 | Comparative Example | 3000 | AL | air | 240° C., 1 hr | dry air | 4.6 |

| No. | | $([Si]_{3/4t} - [Si]_{1/4t})/[Si]_{3/4t}$ | $A_{1/2t}$ | $A_{1/10t}$ | $2 \times A_{1/2t}$ | Surface Hardness | Presence of Absence of Crack in Bending Test | Judgment |
|---|---|---|---|---|---|---|---|---|
| 1 | Example | 0.022 | 0.028 | 0.026 | 0.056 | 2H | none | A |
| 2 | Example | 0.021 | 0.042 | 0.056 | 0.084 | 2H | none | A |
| 3 | Example | 0.021 | 0.128 | 0.269 | 0.256 | H | none | A |
| 4 | Example | 0.011 | 0.116 | 0.351 | 0.323 | 2H | none | A |
| 5 | Example | 0.029 | 0.058 | 0.085 | 0.116 | H | none | A |
| 6 | Example | 0.031 | 0.086 | 0.127 | 0.172 | H | none | A |
| 7 | Example | 0.028 | 0.076 | 0.138 | 0.152 | F | none | A |
| 8 | Example | 0.025 | 0.062 | 0.094 | 0.124 | H | none | A |
| 9 | Example | 0.029 | 0.043 | 0.062 | 0.086 | HB | none | A |
| 10 | Example | 0.031 | 0.069 | 0.117 | 0.138 | F | none | A |
| 11 | Example | 0.023 | 0.057 | 0.122 | 0.114 | B | none | B |
| 12 | Example | 0.041 | 0.046 | 0.051 | 0.092 | B | none | B |
| 13 | Comparative Example | 0.008 | 0.158 | 0.148 | 0.316 | 3H | formed | D |
| 14 | Comparative Example | 0.005 | 0.146 | 0.134 | 0.292 | 2H | formed | D |
| 15 | Comparative Example | 0.011 | 0.148 | 0.125 | 0.296 | 2H | formed | D |
| 16 | Comparative Example | 0.013 | 0.057 | 0.065 | 0.114 | 2B | none | D |
| 17 | Comparative Example | 0.015 | 0.032 | 0.059 | 0.064 | 3B | none | D |
| 18 | Comparative Example | 0.008 | 0.041 | 0.096 | 0.082 | 2B | none | D |

TABLE 5

(Coating Solution E)
Table 5: Coating Solution E

| No. | | Mass-average Molecular Weight of Polydimethyl-siloxane | Metal Element of Metal Alkoxide | Conditions of Heat Treatment After Coating and Drying | | | Thickness of Organic-Inorganic Hybrid Layer (μm) |
|---|---|---|---|---|---|---|---|
| | | | | Drying Atmosphere | Temperature, Time | Atmosphere | |
| 1 | Example | 3000 | Zr | air | 350° C., 1 hr | dry air | 1.5 |
| 2 | Example | 3000 | Zr | air | 350° C., 1 hr | dry air | 1.4 |
| 3 | Example | 3000 | Zr | air | 320° C., 1 hr | dry nitrogen | 2.8 |
| 4 | Example | 3000 | Zr | air | 320° C., 1 hr | dry air | 2.9 |
| 5 | Example | 3000 | Zr | air | 320° C., 1 hr | dry (nitrogen 50%, oxygen 50%) | 2.7 |
| 6 | Example | 3000 | Zr | air | 320° C., 1 hr | dry (nitrogen 90%, oxygen 10%) | 2.9 |
| 7 | Example | 3000 | Zr | dry air | 320° C., 1 hr | dry air | 2.8 |
| 8 | Example | 3000 | Zr | dry air | 320° C., 1 hr | dry air | 2.8 |
| 9 | Example | 3000 | Zr | air | 280° C., 1 hr | air | 2.1 |
| 10 | Example | 3000 | Zr | air | 280° C., 1 hr | dry air | 4.2 |
| 11 | Comparative Example | 3000 | Zr | air | 360° C., 1 hr | air | 0.5 |
| 12 | Comparative Example | 3000 | Zr | air | 360° C., 1 hr | dry air | 1.3 |

TABLE 5-continued (Coating Solution E)
Table 5: Coating Solution E

| | | | | | | | |
|---|---|---|---|---|---|---|---|
| 13 | Comparative Example | 3000 | Zr | air | 350° C., 1 hr | air | 0.7 |
| 14 | Comparative Example | 3000 | Zr | air | 320° C., 1 hr | air | 0.8 |
| 15 | Comparative Example | 3000 | Zr | air | 320° C., 1 hr | nitrogen | 0.9 |
| 16 | Comparative Example | 3000 | Zr | air | 280° C., 1 hr | dry air | 4.1 |
| 17 | Comparative Example | 3000 | Zr | air | 240° C., 1 hr | air | 2.8 |
| 18 | Comparative Example | 3000 | Zr | air | 240° C., 1 hr | dry air | 6.2 |

| No. | | $([Si]_{3/4t} - [Si]_{1/4t})/[Si]_{3/4t}$ | $A_{1/2t}$ | $A_{1/10t}$ | $2 \times A_{1/2t}$ | Surface Hardness | Presence of Absence of Crack in Bending Test | Judgment |
|---|---|---|---|---|---|---|---|---|
| 1 | Example | 0.025 | 0.132 | 0.149 | 0.264 | 2H | none | C |
| 2 | Example | 0.024 | 0.128 | 0.155 | 0.256 | 2H | none | C |
| 3 | Example | 0.038 | 0.143 | 0.165 | 0.286 | 2H | none | A |
| 4 | Example | 0.041 | 0.122 | 0.172 | 0.244 | H | none | A |
| 5 | Example | 0.032 | 0.137 | 0.149 | 0.274 | H | none | A |
| 6 | Example | 0.035 | 0.144 | 0.157 | 0.288 | HB | none | A |
| 7 | Example | 0.036 | 0.136 | 0.168 | 0.272 | HB | none | A |
| 8 | Example | 0.044 | 0.139 | 0.166 | 0.278 | F | none | A |
| 9 | Example | 0.032 | 0.145 | 0.138 | 0.290 | HB | none | A |
| 10 | Example | 0.052 | 0.089 | 0.121 | 0.178 | B | none | B |
| 11 | Comparative Example | 0.004 | 0.155 | 0.141 | 0.310 | 3H | formed | D |
| 12 | Comparative Example | 0.013 | 0.141 | 0.122 | 0.282 | 2H | formed | D |
| 13 | Comparative Example | 0.008 | 0.148 | 0.135 | 0.296 | 3H | formed | D |
| 14 | Comparative Example | 0.018 | 0.135 | 0.121 | 0.270 | H | formed | D |
| 15 | Comparative Example | 0.006 | 0.128 | 0.119 | 0.256 | 2H | formed | D |
| 16 | Comparative Example | 0.045 | 0.075 | 0.138 | 0.150 | 2B | none | D |
| 17 | Comparative Example | 0.036 | 0.111 | 0.092 | 0.222 | 2B | none | D |
| 18 | Comparative Example | 0.045 | 0.077 | 0.063 | 0.154 | 2B | none | D |

TABLE 6

(Coating Solution F)
Table 6: Coating Solution F

| No. | | Mass-average Molecular Weight of Poly-dimethyl-siloxane | Metal Element of Metal Alkoxide | Conditions of Heat Treatment After Coating and Drying | | | Thickness of Organic-Inorganic Hybrid Layer (μm) |
|---|---|---|---|---|---|---|---|
| | | | | Drying Atmosphere | Temperature, Time | Atmosphere | |
| 1 | Example | 2000 | Ti | air | 350° C., 1 hr | dry air | 2.6 |
| 2 | Example | 2000 | Ti | air | 350° C., 1 hr | dry air | 2.4 |
| 3 | Example | 2000 | Ti | air | 320° C., 1 hr | air | 1.4 |
| 4 | Example | 2000 | Ti | air | 320° C., 1 hr | nitrogen | 1.4 |
| 5 | Example | 2000 | Ti | air | 320° C., 1 hr | dry nitrogen | 2.8 |
| 6 | Example | 2000 | Ti | air | 320° C., 1 hr | dry air | 3.1 |
| 7 | Example | 2000 | Ti | air | 320° C., 1 hr | dry (nitrogen 50%, oxygen 50%) | 3.2 |
| 8 | Example | 2000 | Ti | air | 320° C., 1 hr | dry (nitrogen 90%, oxygen 10%) | 3.3 |

TABLE 6-continued (Coating Solution F)
Table 6: Coating Solution F

| No. | | Mass-average Molecular Weight of Polydimethylsiloxane | Metal Element of Metal Alkoxide | Drying Atmosphere | Conditions of Heat Treatment After Coating and Drying Temperature, Time | Atmosphere | Thickness of Organic-Inorganic Hybrid Layer (μm) |
|---|---|---|---|---|---|---|---|
| 9 | Example | 2000 | Ti | dry air | 320° C., 1 hr | dry air | 3.0 |
| 10 | Example | 2000 | Ti | dry air | 320° C., 1 hr | dry air | 2.9 |
| 11 | Example | 2000 | Ti | air | 280° C., 1 hr | air | 1.9 |
| 12 | Example | 2000 | Ti | air | 280° C., 1 hr | dry air | 4.0 |
| 13 | Example | 2000 | Ti | air | 280° C., 1 hr | dry air | 3.8 |
| 14 | Comparative Example | 2000 | Ti | air | 360° C., 1 hr | air | 1.0 |
| 15 | Comparative Example | 2000 | Ti | air | 360° C., 1 hr | dry air | 2.4 |
| 16 | Comparative Example | 2000 | Ti | air | 350° C., 1 hr | air | 1.2 |
| 17 | Comparative Example | 2000 | Ti | air | 240° C., 1 hr | air | 2.3 |
| 18 | Comparative Example | 2000 | Ti | air | 240° C., 1 hr | dry air | 4.9 |

| No. | | $([Si]_{3/4t} - [Si]_{1/4t})/[Si]_{3/4t}$ | $A_{1/2t}$ | $A_{1/10t}$ | $2 \times A_{1/2t}$ | Surface Hardness | Presence of Absence of Crack in Bending Test | Judgment |
|---|---|---|---|---|---|---|---|---|
| 1 | Example | 0.031 | 0.098 | 0.096 | 0.196 | 2H | none | C |
| 2 | Example | 0.034 | 0.081 | 0.078 | 0.162 | 2H | none | C |
| 3 | Example | 0.022 | 0.096 | 0.102 | 0.192 | H | none | A |
| 4 | Example | 0.024 | 0.080 | 0.083 | 0.160 | 2H | none | A |
| 5 | Example | 0.042 | 0.064 | 0.087 | 0.128 | H | none | A |
| 6 | Example | 0.051 | 0.051 | 0.093 | 0.102 | F | none | A |
| 7 | Example | 0.048 | 0.048 | 0.065 | 0.096 | F | none | A |
| 8 | Example | 0.039 | 0.038 | 0.054 | 0.076 | F | none | A |
| 9 | Example | 0.042 | 0.049 | 0.051 | 0.098 | H | none | A |
| 10 | Example | 0.052 | 0.056 | 0.075 | 0.112 | HB | none | A |
| 11 | Example | 0.031 | 0.076 | 0.082 | 0.152 | F | none | A |
| 12 | Example | 0.038 | 0.078 | 0.087 | 0.156 | B | none | B |
| 13 | Example | 0.045 | 0.062 | 0.076 | 0.124 | B | none | B |
| 14 | Comparative Example | 0.014 | 0.133 | 0.110 | 0.266 | 3H | formed | D |
| 15 | Comparative Example | 0.019 | 0.146 | 0.102 | 0.292 | 2H | formed | D |
| 16 | Comparative Example | 0.017 | 0.132 | 0.098 | 0.264 | 3H | formed | D |
| 17 | Comparative Example | 0.013 | 0.088 | 0.072 | 0.176 | 2B | none | D |
| 18 | Comparative Example | 0.007 | 0.076 | 0.061 | 0.152 | 2B | none | D |

TABLE 7

(Coating Solution G)
Table 7: Coating Solution G

| No. | | Mass-average Molecular Weight of Polydimethylsiloxane | Metal Element of Metal Alkoxide | Drying Atmosphere | Conditions of Heat Treatment After Coating and Drying Temperature, Time | Atmosphere | Thickness of Organic-Inorganic Hybrid Layer (μm) |
|---|---|---|---|---|---|---|---|
| 1 | Example | 3000 | Y | air | 350° C., 1 hr | dry air | 2.0 |
| 2 | Example | 3000 | Y | air | 350° C., 1 hr | dry air | 1.8 |
| 3 | Example | 3000 | Y | air | 320° C., 1 hr | dry nitrogen | 3.4 |
| 4 | Example | 3000 | Y | air | 320° C., 1 hr | dry air | 3.6 |
| 5 | Example | 3000 | Y | air | 320° C., 1 hr | dry (nitrogen 50%, oxygen 50%) | 3.2 |
| 6 | Example | 3000 | Y | air | 320° C., 1 hr | dry (nitrogen 90%, oxygen 10%) | 3.4 |
| 7 | Example | 3000 | Y | dry air | 320° C., 1 hr | dry air | 3.2 |
| 8 | Example | 3000 | Y | dry air | 320° C., 1 hr | dry air | 3.4 |
| 9 | Example | 3000 | Y | air | 280° C., 1 hr | air | 2.7 |

TABLE 7-continued (Coating Solution G)
Table 7: Coating Solution G

| | | | | | | | |
|---|---|---|---|---|---|---|---|
| 10 | Example | 3000 | Y | air | 280° C., 1 hr | dry air | 5.1 |
| 11 | Example | 3000 | Y | air | 280° C., 1 hr | dry air | 4.9 |
| 12 | Comparative Example | 3000 | Y | air | 360° C., 1 hr | air | 0.9 |
| 13 | Comparative Example | 3000 | Y | air | 360° C., 1 hr | dry air | 1.7 |
| 14 | Comparative Example | 3000 | Y | air | 350° C., 1 hr | air | 1.3 |
| 15 | Comparative Example | 3000 | Y | air | 320° C., 1 hr | air | 1.1 |
| 16 | Comparative Example | 3000 | Y | air | 320° C., 1 hr | nitrogen | 1.0 |
| 17 | Comparative Example | 3000 | Y | air | 240° C., 1 hr | air | 3.4 |
| 18 | Comparative Example | 3000 | Y | air | 240° C., 1 hr | dry air | 6.9 |

| No. | | $([Si]_{3/4t} - [Si]_{1/4t})/[Si]_{3/4t}$ | $A_{1/2t}$ | $A_{1/10t}$ | $2 \times A_{1/2t}$ | Surface Hardness | Presence of Absence of Crack in Bending Test | Judgment |
|---|---|---|---|---|---|---|---|---|
| 1 | Example | 0.035 | 0.114 | 0.126 | 0.228 | 2H | none | C |
| 2 | Example | 0.029 | 0.097 | 0.108 | 0.194 | 2H | none | C |
| 3 | Example | 0.046 | 0.062 | 0.083 | 0.124 | H | none | A |
| 4 | Example | 0.058 | 0.081 | 0.095 | 0.162 | F | none | A |
| 5 | Example | 0.062 | 0.075 | 0.086 | 0.150 | F | none | A |
| 6 | Example | 0.045 | 0.062 | 0.077 | 0.124 | HB | none | A |
| 7 | Example | 0.031 | 0.073 | 0.095 | 0.146 | F | none | A |
| 8 | Example | 0.048 | 0.086 | 0.102 | 0.172 | HB | none | A |
| 9 | Example | 0.075 | 0.063 | 0.058 | 0.126 | HB | none | A |
| 10 | Example | 0.089 | 0.122 | 0.145 | 0.244 | B | none | B |
| 11 | Example | 0.104 | 0.113 | 0.132 | 0.226 | B | none | B |
| 12 | Comparative Example | 0.008 | 0.165 | 0.150 | 0.330 | 3H | formed | D |
| 13 | Comparative Example | 0.015 | 0.124 | 0.109 | 0.248 | 2H | formed | D |
| 14 | Comparative Example | 0.012 | 0.143 | 0.127 | 0.286 | 3H | formed | D |
| 15 | Comparative Example | 0.018 | 0.132 | 0.122 | 0.264 | 2H | formed | D |
| 16 | Comparative Example | 0.009 | 0.154 | 0.141 | 0.308 | H | formed | D |
| 17 | Comparative Example | 0.242 | 0.078 | 0.147 | 0.156 | 2B | none | D |
| 18 | Comparative Example | 0.268 | 0.068 | 0.143 | 0.136 | 3B | none | D |

TABLE 8

(Coating Solution H)
Table 8: Coating Solution H

| No. | | Mass-average Molecular Weight of Polydimethylsiloxane | Metal Element of Metal Alkoxide | Conditions of Heat Treatment After Coating and Drying | | | Thickness of Organic-Inorganic Hybrid Layer (μm) |
|---|---|---|---|---|---|---|---|
| | | | | Drying Atmosphere | Temperature, Time | Atmosphere | |
| 1 | Example | 3000 | Nb | air | 350° C., 1 hr | dry air | 2.4 |
| 2 | Example | 3000 | Nb | air | 350° C., 1 hr | dry air | 2.2 |
| 3 | Example | 3000 | Nb | air | 320° C., 1 hr | dry nitrogen | 3.8 |
| 4 | Example | 3000 | Nb | air | 320° C., 1 hr | dry air | 3.9 |
| 5 | Example | 3000 | Nb | air | 320° C., 1 hr | dry (nitrogen 50%, oxygen 50%) | 3.6 |
| 6 | Example | 3000 | Nb | air | 320° C., 1 hr | dry (nitrogen 90%, oxygen 10%) | 3.8 |

TABLE 8-continued (Coating Solution H)
Table 8: Coating Solution H

| | | | | | | | |
|---|---|---|---|---|---|---|---|
| 7 | Example | 3000 | Nb | dry air | 320° C., 1 hr | dry air | 3.7 |
| 8 | Example | 3000 | Nb | dry air | 320° C., 1 hr | dry air | 3.9 |
| 9 | Example | 3000 | Nb | air | 280° C., 1 hr | air | 3.0 |
| 10 | Comparative Example | 3000 | Nb | air | 360° C., 1 hr | air | 1.3 |
| 11 | Comparative Example | 3000 | Nb | air | 360° C., 1 hr | dry air | 2.2 |
| 12 | Comparative Example | 3000 | Nb | air | 350° C., 1 hr | air | 1.7 |
| 13 | Comparative Example | 3000 | Nb | air | 320° C., 1 hr | air | 1.3 |
| 14 | Comparative Example | 3000 | Nb | air | 320° C., 1 hr | nitrogen | 1.3 |
| 15 | Comparative Example | 3000 | Nb | air | 280° C., 1 hr | dry air | 5.4 |
| 16 | Comparative Example | 3000 | Nb | air | 280° C., 1 hr | dry air | 5.2 |
| 17 | Comparative Example | 3000 | Nb | air | 240° C., 1 hr | air | 3.4 |
| 18 | Comparative Example | 3000 | Nb | air | 240° C., 1 hr | dry air | 7.4 |

| No. | | $([Si]_{3/4t} - [Si]_{1/4t})/[Si]_{3/4t}$ | $A_{1/2t}$ | $A_{1/10t}$ | $2 \times A_{1/2t}$ | Surface Hardness | Presence of Absence of Crack in Bending Test | Judgment |
|---|---|---|---|---|---|---|---|---|
| 1 | Example | 0.029 | 0.076 | 0.089 | 0.152 | 2H | none | C |
| 2 | Example | 0.034 | 0.088 | 0.107 | 0.176 | 2H | none | C |
| 3 | Example | 0.038 | 0.071 | 0.093 | 0.142 | H | none | A |
| 4 | Example | 0.061 | 0.069 | 0.098 | 0.138 | H | none | A |
| 5 | Example | 0.042 | 0.085 | 0.103 | 0.170 | F | none | A |
| 6 | Example | 0.053 | 0.076 | 0.113 | 0.152 | HB | none | A |
| 7 | Example | 0.062 | 0.064 | 0.094 | 0.128 | HB | none | A |
| 8 | Example | 0.056 | 0.058 | 0.086 | 0.116 | B | none | B |
| 9 | Example | 0.025 | 0.042 | 0.096 | 0.084 | B | none | B |
| 10 | Comparative Example | 0.011 | 0.123 | 0.136 | 0.246 | 3H | formed | D |
| 11 | Comparative Example | 0.018 | 0.096 | 0.108 | 0.192 | 2H | formed | D |
| 12 | Comparative Example | 0.011 | 0.083 | 0.095 | 0.166 | 3H | formed | D |
| 13 | Comparative Example | 0.018 | 0.081 | 0.078 | 0.162 | 2H | formed | D |
| 14 | Comparative Example | 0.012 | 0.076 | 0.096 | 0.152 | 2H | formed | D |
| 15 | Comparative Example | 0.012 | 0.045 | 0.078 | 0.090 | 2B | none | D |
| 16 | Comparative Example | 0.010 | 0.055 | 0.082 | 0.110 | 2B | none | D |
| 17 | Comparative Example | 0.017 | 0.038 | 0.032 | 0.076 | 2B | none | D |
| 18 | Comparative Example | 0.008 | 0.023 | 0.059 | 0.046 | 3B | none | D |

From the results as shown in Tables 1 to 8, the followings were observed.

In a high-temperature heat treatment (herein, 360° C. or more), even when the heat treatment atmosphere is changed, the crosslinking reaction may proceed so as to result in a film structure that is hard and susceptible to crack formation. This may be predicted not only from the film surface but also from the difference in the Si concentration distribution in the film.

As the temperature is decreased, the surface hardness of the film may tend to be decreased and along therewith, the Si concentration distribution may be changed. By selecting the heat treatment atmosphere, the ratio between metaloxane and dimethylsiloxane in the film can be controlled, and as a result, a film structure satisfying the flexibility while maintaining the film surface hardness can be formed.

In a low-temperature heat treatment (herein, 240° C. or less), the crosslinking reaction may not proceed, and the ratio of dimethylsiloxane may be large, whereby only a film with soft surface can be obtained.

DESCRIPTION OF REFERENCE NUMERALS

1: An example of the profile of the organic-inorganic hybrid layer according to the present invention
2: An example of the profile of the organic-inorganic hybrid layer in the prior art.

The invention claimed is:
1. An insulating film-coated metal foil comprising a metal foil and an organic-inorganic hybrid layer disposed on one surface or both surfaces of the metal foil, wherein the organic-inorganic hybrid layer is a layer which has been obtained by blending a polydimethylsiloxane and a metal alkoxide containing one or more metals selected from: Mg, Ca, Y, Al, Sn, Ti, Zr, Nb, Ta and W, the concentration $[Si]_{1/4t}$ of Si at a depth of ¼t from the surface of the organic-inorganic hybrid layer along the thickness direction of the layer has the following relationship with the concentration $[Si]_{3/4t}$ of Si at a depth of ¾t from the surface of the organic-inorganic hybrid layer along the thickness direction of the layer:

$[Si]_{1/4t} \leq [Si]_{3/4t}$ and the value of the relative ratio of the Si concentrations, $R_{Si} = ([Si]_{3/4t} - [Si]_{1/4t})/[Si]_{3/4t}$, is from 0.02 to 0.23.

2. The insulating film-coated metal foil according to claim 1, wherein ratio $A_{1/2t} = [M]_{1/2t}/[Si]_{1/2t}$ between the concentration $[Si]_{1/2t}$ of Si and the concentration $[M]_{1/2t}$ of metal element M of a metaloxane comprising a metal element except for Si at a depth of ½t from the surface of the organic-inorganic hybrid layer along the thickness direction of the layer has the following relationship with the ratio: $A_{1/10t} = [M]_{1/10t}/[Si]_{1/10t}$ between the concentration $[Si]_{1/10t}$ of Si and the concentration $[M]_{1/10t}$ of metal element M of the metaloxane at a depth of 1/10t from the surface of the organic-inorganic hybrid layer along the thickness direction of the layer:

$1.0 \times A_{1/2t} < A_{1/10t} < 2.0 \times A_{1/2t}$.

3. A process for producing an insulating film-coated metal foil having an organic-inorganic hybrid layer, comprising:
coating a metal foil with a liquid which has been obtained by blending a polydimethylsiloxane and a metal alkoxide containing one or more metals selected from: Mg, Ca, Y, Al, Sn, Ti, Zr, Nb, Ta and W,
drying the coating at 70 to 210° C., and
subjecting the coating to temperature elevation at a temperature rise rate of 30 to 80° C./min and holding the temperature at 250 to 600° C. for 30 to 240 minutes,
wherein the concentration $[Si]_{1/4t}$ of Si at a depth of ¼t from the surface of the organic-inorganic hybrid layer along the thickness direction of the layer has the following relationship with the concentration $[Si]_{3/4t}$ of Si at a depth of ¾t from the surface of the organic-inorganic hybrid layer along the thickness direction of the layer:

$[Si]_{1/4t} < [Si]_{3/4t}$ and the value of the relative ratio of the Si concentrations, $R_{Si} = ([Si]_{3/4t} - [Si]_{1/4t})/[Si]_{3/4t}$, is from 0.02 to 0.23.

4. The process for producing an insulating film-coated metal foil according to claim 3, wherein the ratio $A_{1/2t} = [M]_{1/2t}/[Si]_{1/2t}$ between the concentration $[Si]_{1/2t}$ of Si and the concentration $[M]_{1/2t}$ of metal element M of a metaloxane comprising a metal element other than Si at a depth of ½t from the surface of the organic-inorganic hybrid layer along the thickness direction of the layer has the following relationship with the ratio: $A_{1/10t} = [M]_{1/10t}/[Si]_{1/10t}$ between the concentration $[Si]_{1/10t}$ of Si and the concentration $[M]_{1/10t}$ of metal element M of the metaloxane at a depth of 1/10t from the surface of the organic-inorganic hybrid layer along the thickness direction of the layer:

$1.0 \times A_{1/2t} < A_{1/10t} < 2.0 \times A_{1/2t}$.

* * * * *